(12) United States Patent
Lee et al.

(10) Patent No.: US 11,138,228 B2
(45) Date of Patent: *Oct. 5, 2021

(54) ORG SYNC ASYNC SUBSCRIBE EMAILS

(71) Applicant: salesforce.com, inc., San Francisco, CA (US)

(72) Inventors: Jong Lee, Pleasanton, CA (US);
Joonyul Lee, Berkeley, CA (US);
Yamuna Esaiarasan, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,765

(22) Filed: Sep. 27, 2019

(65) Prior Publication Data

US 2020/0026713 A1 Jan. 23, 2020

Related U.S. Application Data

(63) Continuation of application No. 15/391,605, filed on Dec. 27, 2016, now Pat. No. 10,496,673.

(51) Int. Cl.
*G06F 16/00* (2019.01)
*G06F 16/27* (2019.01)
(Continued)

(52) U.S. Cl.
CPC ........ *G06F 16/273* (2019.01); *G06F 16/2379* (2019.01); *G06Q 10/10* (2013.01);
(Continued)

(58) Field of Classification Search
CPC .............. G06F 19/3468; G06F 16/212; G06F 16/2358; G06F 16/2379; G06F 16/27
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

U.S. Office Action dated Dec. 31, 2018 issued in U.S. Appl. No. 15/391,605.
(Continued)

*Primary Examiner* — Yicun Wu
(74) *Attorney, Agent, or Firm* — Weaver Austin Villeneuve & Sampson LLP

(57) ABSTRACT

Disclosed are some implementations of systems, apparatus, methods and computer program products for performing an asynchronous subscription process that enables a secondary organization to subscribe to receive data from a primary organization. A primary organization provides publish data indicating fields to which a secondary organization can subscribe. The secondary organization provides subscription data that indicates published fields to which the secondary organization has subscribed. In some implementations, a state of a connection between the primary organization and the secondary organization is maintained and updated to ensure that the publish data and subscription data cannot be modified until the subscription process is completed.

20 Claims, 13 Drawing Sheets

(51) Int. Cl.
  *H04L 29/08* (2006.01)
  *G06F 16/23* (2019.01)
  *G06Q 10/10* (2012.01)

(52) U.S. Cl.
  CPC ....... *G06Q 10/107* (2013.01); *H04L 67/1095* (2013.01); *H04L 67/1097* (2013.01); *H04L 67/306* (2013.01); *H04L 67/02* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,158,007 A | 12/2000 | Moreh et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,487,512 B2 * | 2/2009 | Brunswig ............... H04L 67/02 719/316 |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,496,673 B2 | 12/2019 | Lee et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |

(56) References Cited

U.S. PATENT DOCUMENTS

| | | |
|---|---|---|
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0138112 A1 | 6/2005 | Sagar et al. |
| 2005/0209990 A1 | 9/2005 | Ordille et al. |
| 2006/0095914 A1 | 5/2006 | Mankovski |
| 2006/0225075 A1 | 10/2006 | Mankovski et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2018/0173779 A1 | 6/2018 | Lee et al. |
| 2018/0181636 A1 | 6/2018 | Lee et al. |
| 2020/0097577 A1 | 3/2020 | Nielsen et al. |

OTHER PUBLICATIONS

U.S. Notice of Allowance dated Jun. 27, 2019 issued in U.S. Appl. No. 15/391,605.
"Google Plus Users", Google+Ripples, Oct. 31, 2011 [retrieved on Feb. 21, 2012 from Internet at http://www.googleplusers.com/google-ripples.html], 3 pages.
U.S. Appl. No. 16/138,322, filed Sep. 21, 2018, Nielsen et al.

* cited by examiner

ORG SYNC ASYNC SUBSCRIBE EMAILS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to a subscription process that specifies the types of data to be shared between organizations. More specifically, this patent document discloses techniques for an asynchronous subscription process that supports communication regarding data types published by a first organization and subscribed to by a second organization.

BACKGROUND

"Cloud computing" services provide shared resources, applications, and information to computers and other devices upon request. In cloud computing environments, data can be provided by servers via the Internet rather than relying on data available locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
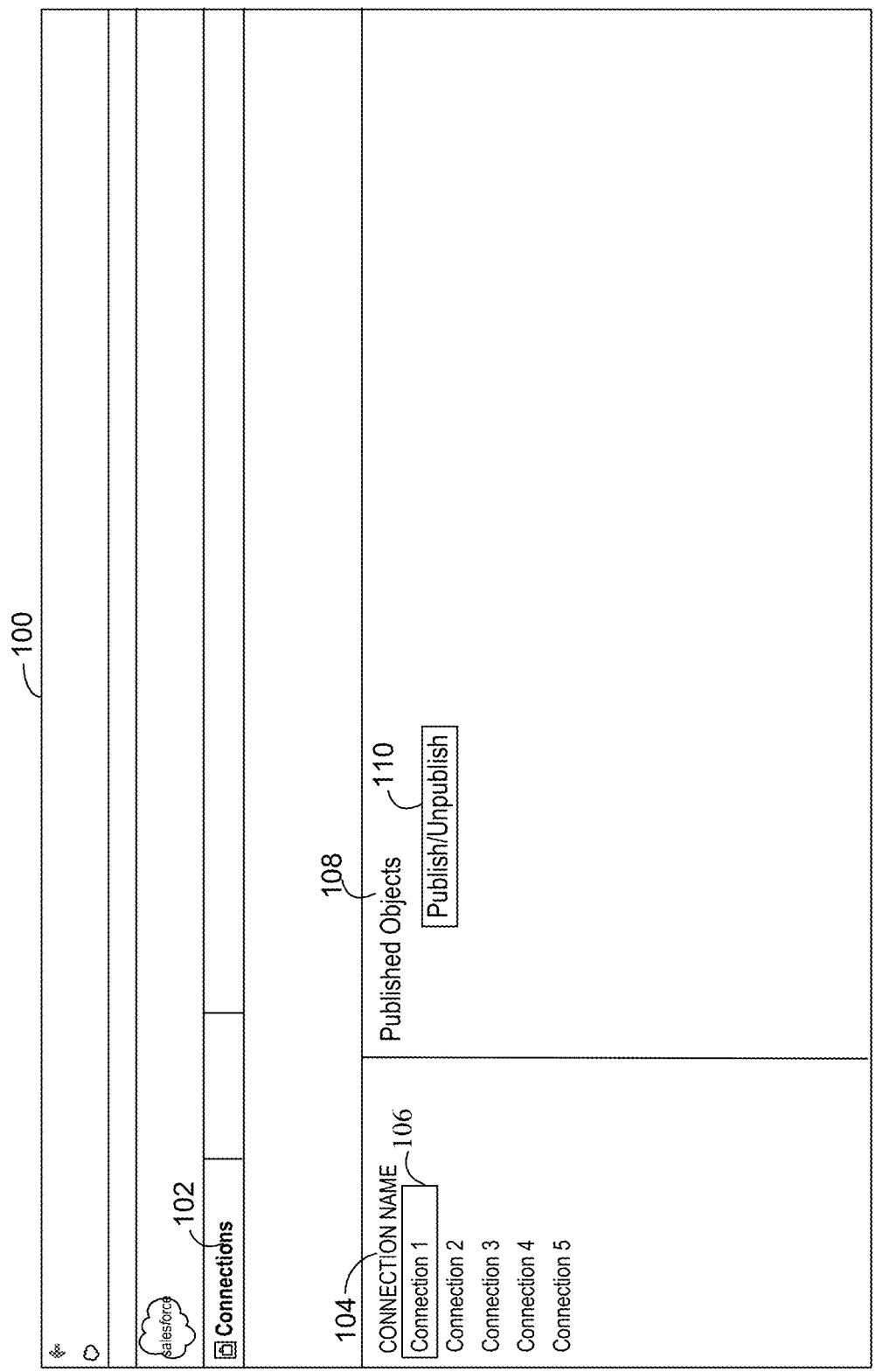
FIG. 1 shows an example of a user interface (UI) 100 for providing publication of objects and associated fields for synchronization of data, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

In accordance with various implementations, a system of a primary organization and a system of a secondary organization are each configured with an Organization Sync feature that allows data to be shared or synchronized between the primary organization and the secondary organization. The systems of the primary and secondary organizations may be implemented at the same location or separate locations. Where the systems are connected to the Internet, communications may be transmitted between the organizations regardless of their respective locations. Each system includes a database system implemented using at least one server system, where the database system includes at least one database. To simplify the following description, the system of the primary organization and the system of the secondary organization will be referred to as "primary organization" and "secondary organization," respectively.

Some implementations of the disclosed systems, apparatus, methods and computer program products are configured to provide a publish-subscribe process for sharing data between two different organizations. Through a publish-subscribe process, the types of data to be shared by the primary organization with the secondary organization may be specified. For example, a primary organization may publish a list of object types and associated fields that correspond to data items stored in database(s) of the primary organization and available for subscription by a secondary organization. The secondary organization may then subscribe to the published object types and fields or a subset thereof so that it may access data items corresponding to the subscribed object types and fields. In some instances, the object types and fields to which the secondary organization subscribes may map to different (e.g., custom) object types and/or fields of its own database(s). The published data types (e.g., object types and associated fields) may be referred to as "publish data," while the subset of the published data types to which the secondary organization has subscribed may be referred to as "subscription data."

In some implementations, a user of the secondary organization may submit the subscription data via a user interface (UI) that presents the publish data as selectable options. A subscription process may subsequently be initiated by the secondary organization after the user of the secondary organization submits the subscription data. During the subscription process, the secondary organization ensures that the subscription data is provided to and saved by the primary organization. In addition, the subscription process may include mapping the subscription data to corresponding object types and associated fields of database(s) of the secondary organization.

After the subscription process has been successfully completed, data items that correspond to the subscription data may be shared by the secondary organization with the primary organization, either automatically or in response to a manual command. For instance, the sharing of the data items by the primary organization may include updating (e.g., modifying, storing, or deleting) data items within database(s) of the secondary organization. After the database(s) of the secondary organization have been updated, users of the primary organization may be redirected to the secondary organization during periods when the primary organization is unavailable.

In some of the disclosed implementations, techniques are provided to ensure that the publish data and subscription data remain unchanged until the subscription process is completed. For instance, each of the organizations may maintain a state of the connection between the two organizations that is updated to reflect the status of the subscription process. In some instances, implementations of the disclosed techniques can be particularly useful where the subscription data submitted via a user interface (UI) designates a significant number of object types and/or associated fields. For example, an organization may maintain data corresponding to 2000 object types, with 800 fields for each object type. By initiating the subscription process asynchronously, timeout issues may be avoided. If a system encounters an error during the subscription process, the subscription process may "fail safe" to the previous condition or status of the system.

By way of illustration, John is an administrator at primary organization, Pyramid Construction, Inc. John logs in to the primary organization and uses an online platform providing a UI that enables John to publish object types and associated fields that are available for subscription from the primary organization by a secondary organization, Universal Containers. Roy is an administrator at the secondary organization. Roy logs in to the secondary organization and uses an online platform to subscribe to the published object types and associated fields, or a subset thereof. The disclosed techniques may be applied to implement an asynchronous subscription process, as will be described in further detail below.

FIG. 1 shows an example of a user interface (UI) 100 for providing publication of objects and associated fields for synchronization of data, in accordance with some implementations. In FIG. 1, UI 100 includes a variety of graphical components situated at different locations in UI 100. Connections tab 102 is one of possibly several or many tabs, which can be opened in UI 100. Each tab can be selected to access a respective page or segment of UI 100. In this example, after a user logs in to the primary organization, the user navigates to Connections tab 102 and selects Connections tab 102 to access Connections component 104 of UI 100. Connections component 104 presents a number of existing Connections in the Connection Name column of Connections component 104. Each connection represents a digital communication path that has been established between two different organizations. The user clicks on the name of a connection to select a particular Connection 106 between two organizations. As shown in FIG. 1, Connection 1 between the primary organization and the secondary organization has been selected.

In FIG. 1, another component of UI 100 is a Published Objects component 108. As shown in FIG. 1, Published Objects component 108 is configured with a Publish/Unpublish component 110, which the user can click on to publish specific object types and associated fields of database(s) of the primary organization. By the same token, the user can click on Publish/Unpublish component 110 to unpublish specific object types and/or associated fields of database(s) of the primary organization. More particularly, for a selected object type, the user may choose to publish at least a subset of the corresponding fields. In this example, the user clicks on Publish/Unpublish component 110, which enables the user to select object types, as well as specific fields of the selected object types.

Figure 2:
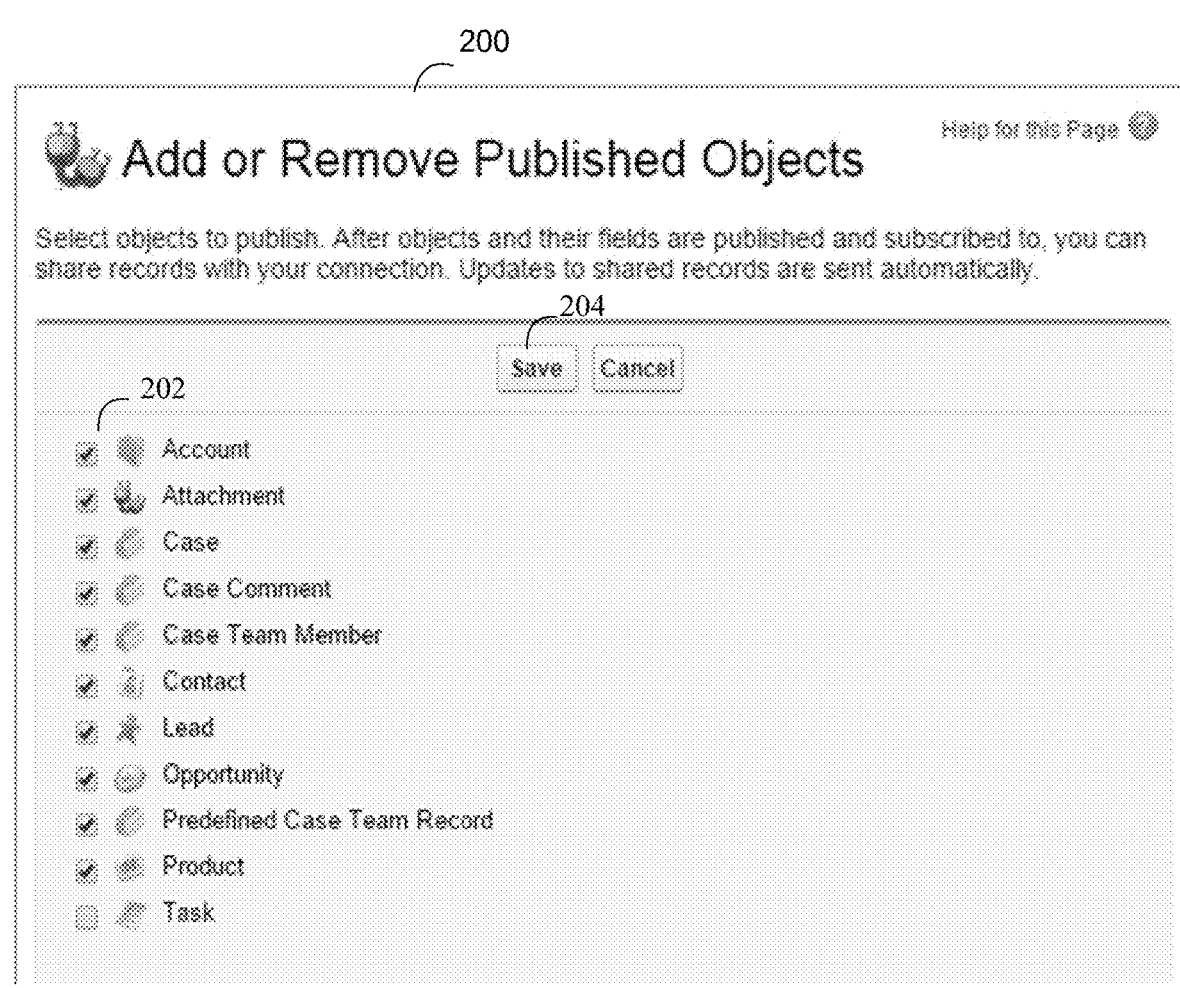
FIG. 2 shows an example of a UI 200 for selecting objects and associated fields for publication, in accordance with some implementations.

FIG. 2 shows an example of a UI 200 for selecting objects and associated fields for publication, in accordance with some implementations. UI 200 presents object types 202 corresponding to objects or data records of database(s) of the primary organization. A user may select any of object types 202 for publication. In this example, the user clicks on boxes displayed adjacent to object types 202 to select the object types to publish. After various object types 202 have been selected, the user may save the selections by clicking on Save component 204.

In some implementations, all fields of the selected object types are published by default. In other implementations, fields of a selected object type are presented for selection and the user may select a subset of the fields for publication.

Figure 3:
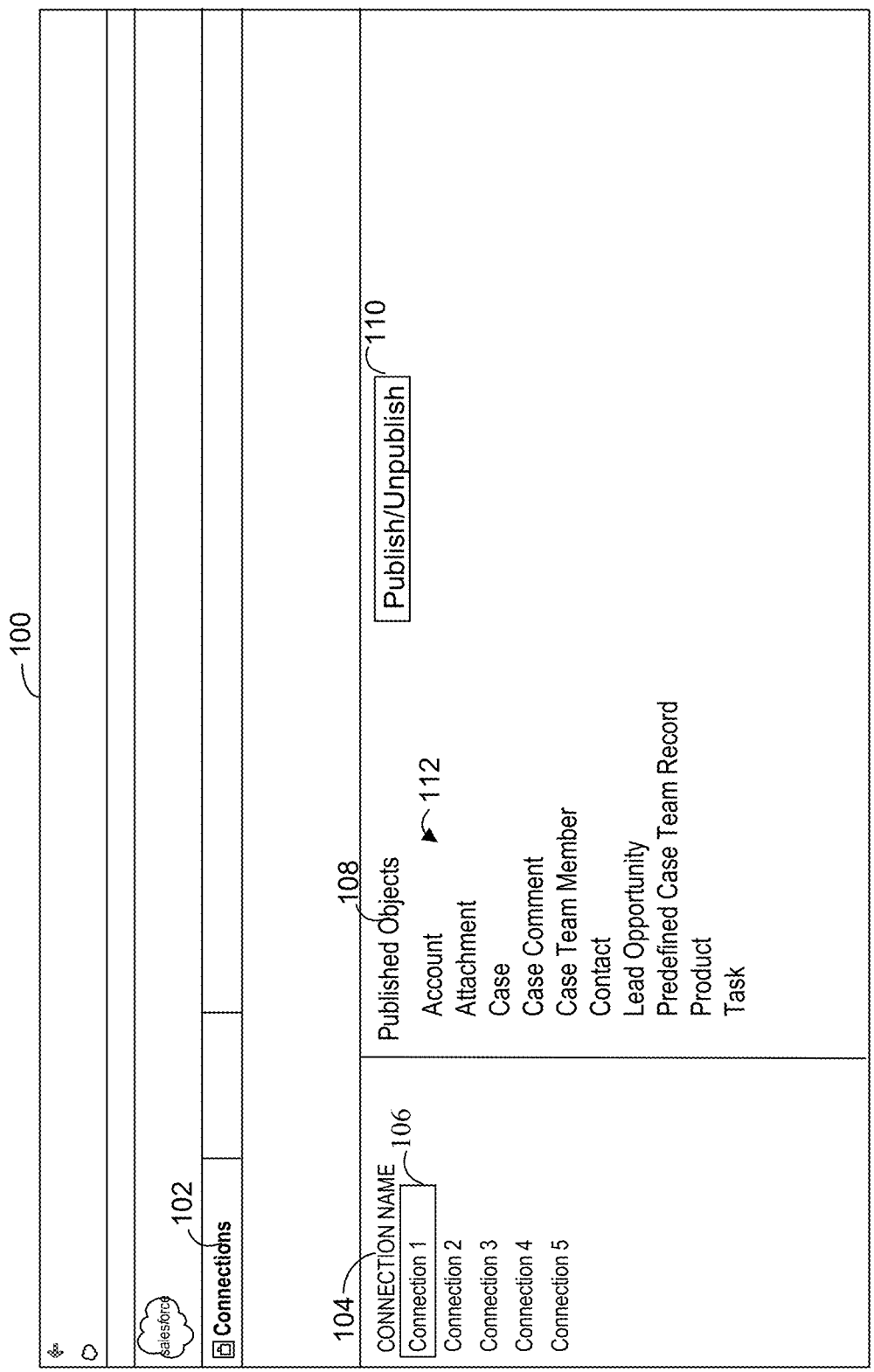
FIGS. 3 and 4 show examples of different states of UI 100, in accordance with some implementations.
Figure 4:
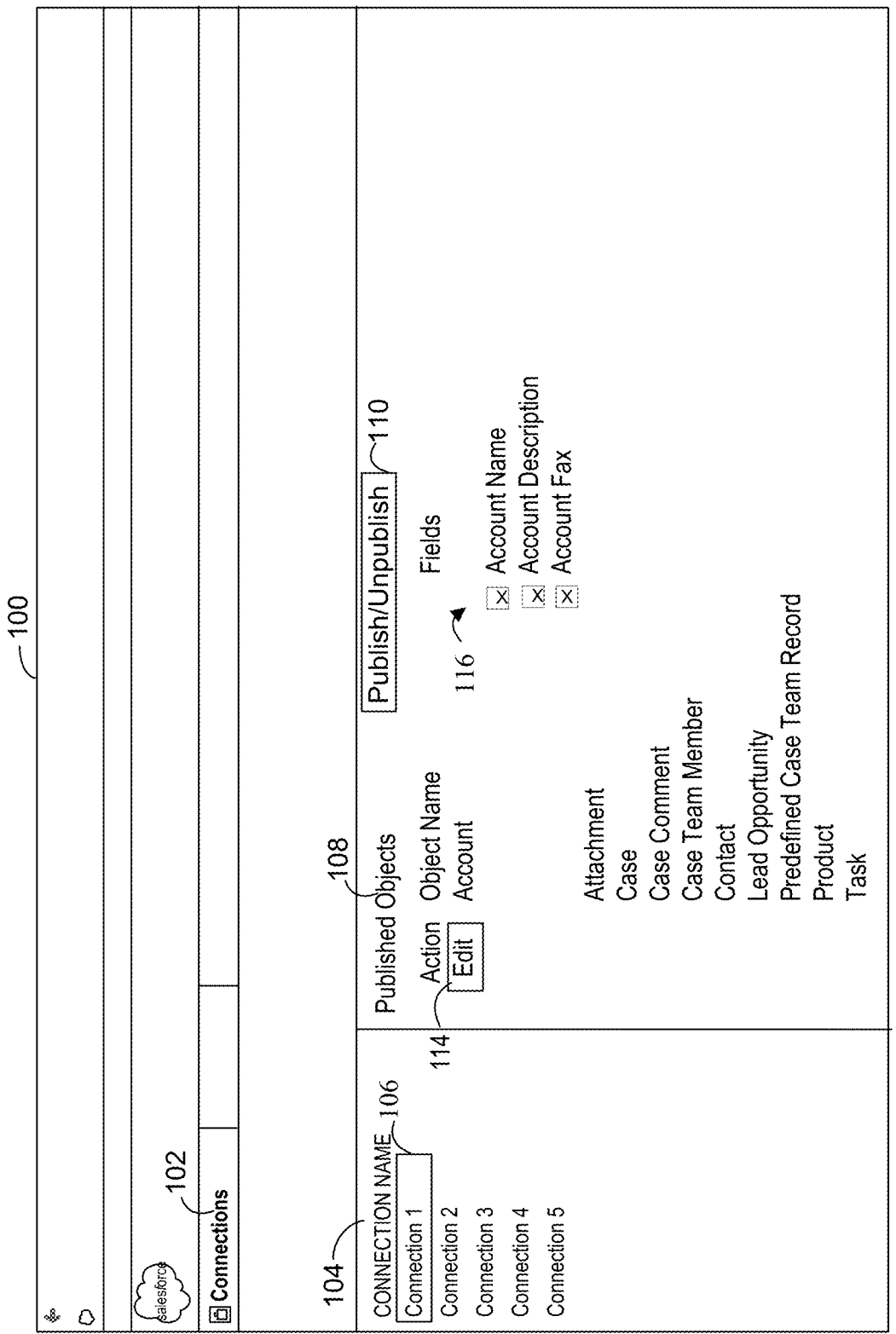

FIGS. 3 and 4 show examples of different states of UI 100, in accordance with some implementations. As shown in FIG. 3, after objects and associated fields have been published by the primary organization, the published object types may be presented as shown at 112. In this example, the published object types are displayed within Published Objects component 108.

If a user of the primary organization wishes to edit the fields that are published by the primary organization for subscription by the secondary organization, the user may click on an Edit component 114 to publish selected fields for a particular object type. In this example, the user has chosen to publish fields for the "Account" object type. As shown at 116, the user has elected to publish the "Account Name," "Account Description," and "Account Fax" fields of the "Account" object type. The term "publish data" may be used to refer to metadata that indicates the set of object types and associated fields that are published by the primary organization and available via subscription by the secondary organization. After the publish data has been updated and saved, the primary organization may make the publish data available to the secondary organization.

Figure 5A:
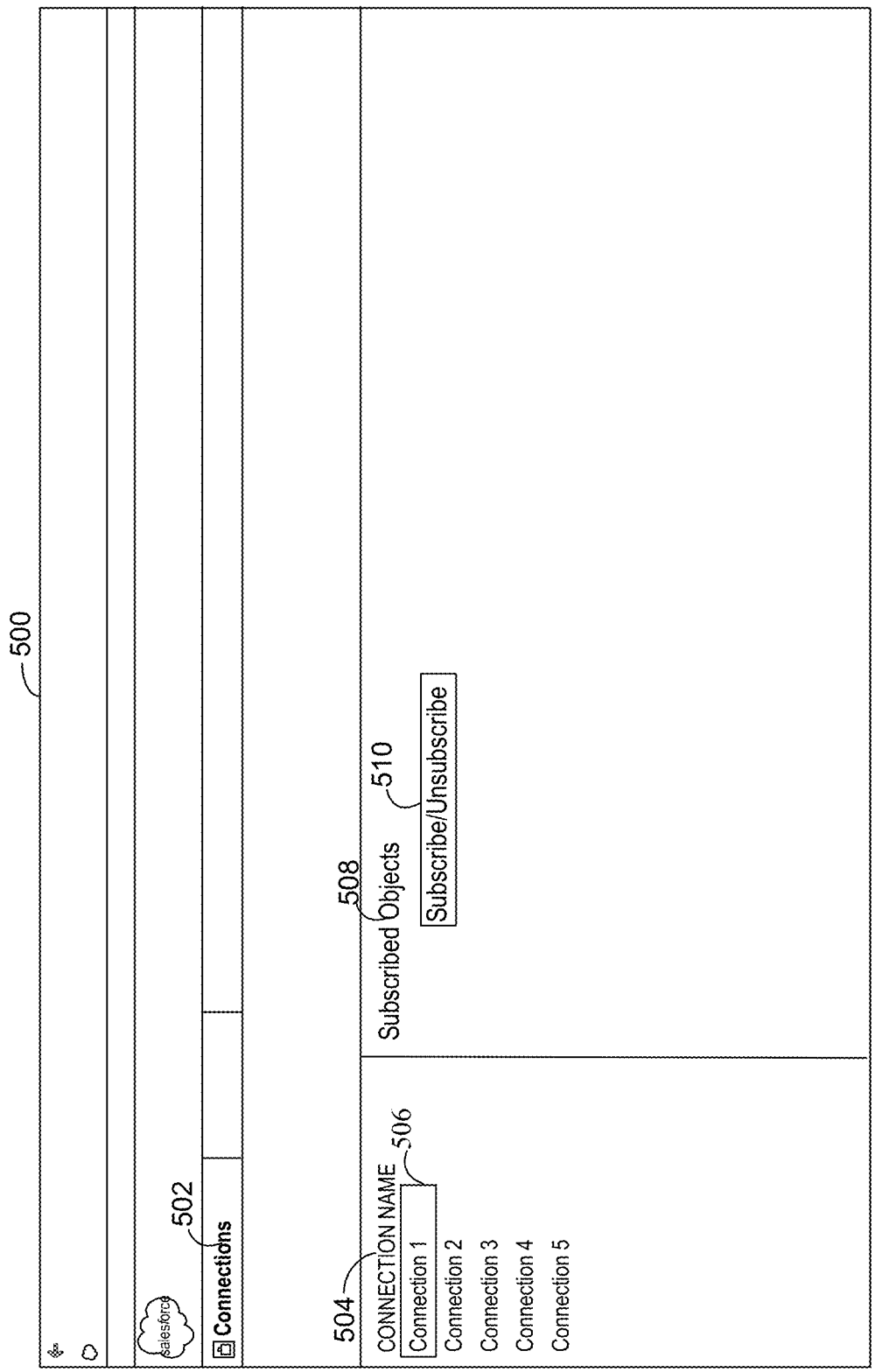
FIG. 5A shows an example of a UI 500 for providing subscription to published objects and associated fields, in accordance with some implementations.

FIG. 5A shows an example of a UI 500 for providing subscription to published objects and associated fields, in accordance with some implementations. In FIG. 5A, UI 500 includes a variety of graphical components situated at different locations in UI 500. These components include a Connections tab 502, which is one of possibly several or many tabs, which can be opened in UI 500. Each tab can be selected to access a respective page or segment of UI 500. In this example, after a user logs in to the secondary organization, the user navigates to Connections tab 502 and selects Connections tab 502 to access Connections component 504 of UI 500. Connections component 504 presents a number of existing connections in the Connection Name column of Connections component 504. The user clicks on the name of a connection to select a particular connection 506 between two organizations. As shown in FIG. 5A, Connection 1 between the primary organization and the secondary organization has been selected.

In FIG. 5A, another component of UI 500 is a Subscribed Objects component 508. In this example, Subscribed Objects component 508 is configured with a Subscribe/Unsubscribe component 510, which the user can click on to subscribe to data types (e.g., specific object types and/or associated fields) of database(s) of the primary organization. By the same token, the user can click on Subscribe/Unsubscribe component 510 to unsubscribe to specific data types (e.g., object types and/or associated field(s) of database(s)) of the primary organization. In this example, the user clicks on Subscribe/Unsubscribe component 510, which enables the user to select from published object types and associated fields.

Figure 5B:
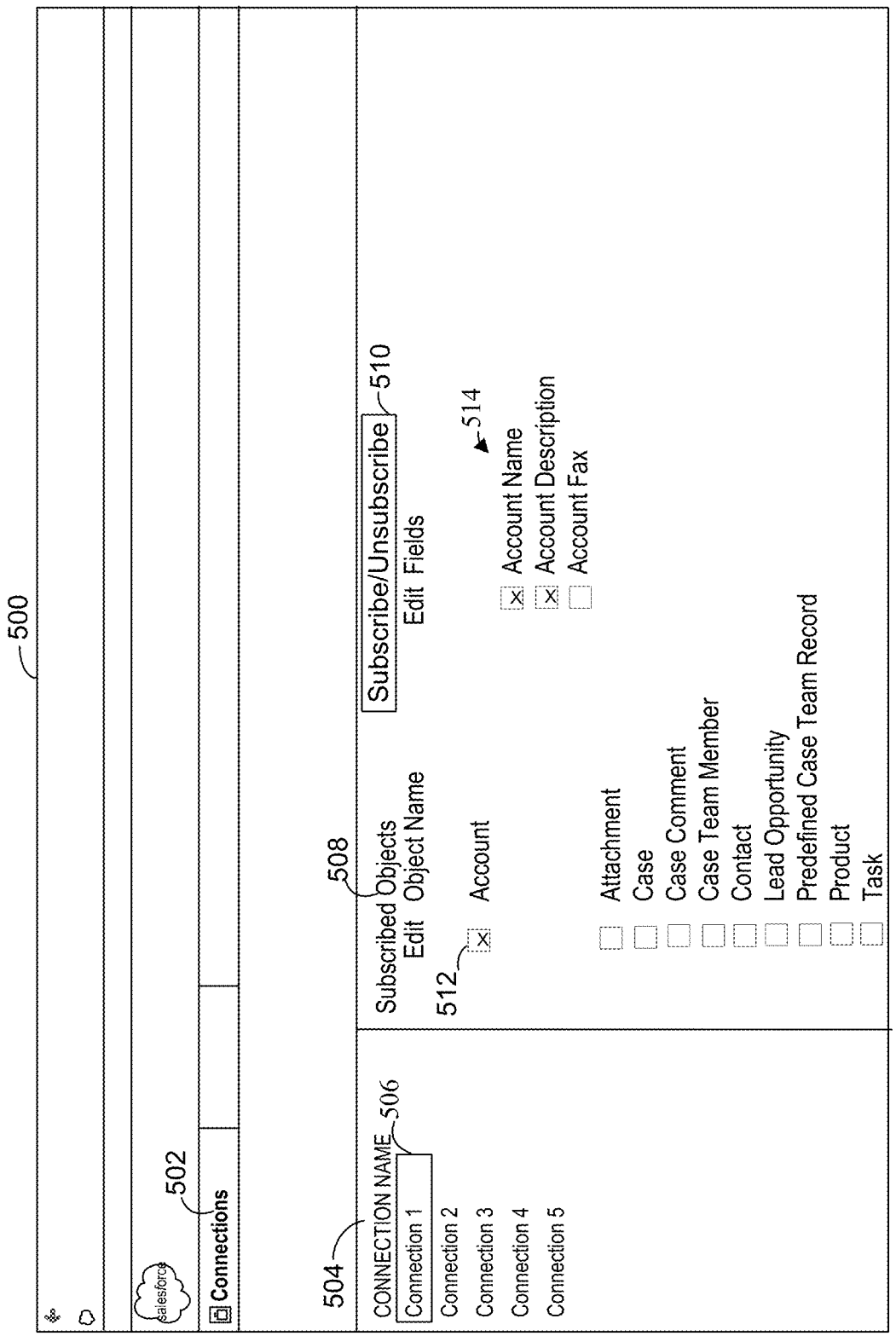
FIG. 5B shows an example of a different state of UI 500, in accordance with some implementations.

FIG. 5B shows an example of a different state of UI 500, in accordance with some implementations. In this example, to subscribe to a subset of the fields of a particular object type, the user may click on an Edit component 512 to select specific fields for a particular object type. In this example, the user has chosen to select fields for the "Account" object type. As shown at 514, the user has elected to subscribe to published "Account Name" and "Account Description" fields of the "Account" object type, but not published "Account Fax" field of the "Account" object type. The term "subscription data" may be used to refer to metadata that indicates a subset of the published data types (e.g., object types and/or fields) to which the secondary organization has subscribed.

Each organization may use standard databases or custom database(s). Customization of a database may include using custom object types and/or custom fields. As a result, the fields of the primary organization may not map directly to fields of the database(s) of the secondary organization.

To subscribe to specific object types of the primary organization, a user of the secondary organization may map selected published object types to object types of the secondary organization. In addition, a user of the secondary organization may map selected published fields to fields of the secondary organization.

Figure 5C:
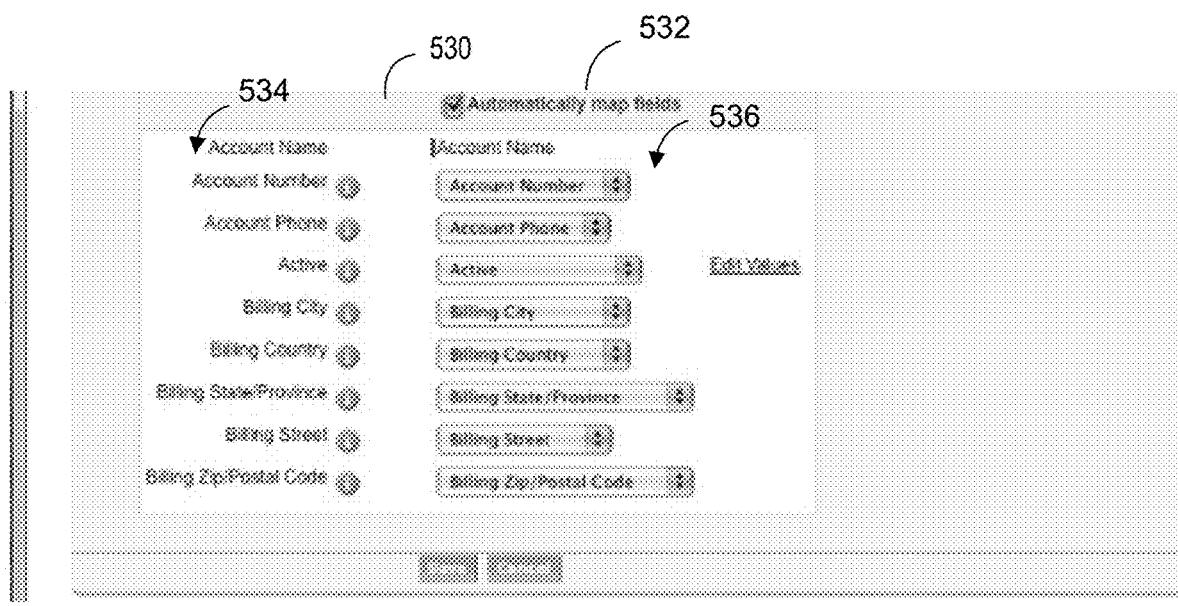
FIG. 5C shows an example of a UI 530 for mapping fields, in accordance with some implementations.

FIG. 5C shows an example of a UI 530 for mapping fields, in accordance with some implementations. In FIG. 5C, a user has elected to subscribe to the object type "Account." A component of UI 530 is a graphical representation 532 that may be selected to automatically map the published fields of the object type "Account" to fields of the secondary organization. As shown in FIG. 5C, published fields 534 of the primary organization may be presented in the form of a list adjacent to selectable fields 536 of the secondary organization. In this example, each field of the published object type, "Account," is mapped to the same field of the object type, "Account," in the secondary organization. Therefore, the subscription data may indicate the mapping between the objects and fields of the primary organization and those of the secondary organization.

Once the subscription data has been updated at the secondary organization, the secondary organization may initiate a subscription process to communicate the subscription data to the primary organization. Examples of methods performed by the primary organization and the secondary organization will be described in further detail below with reference to FIG. 6A and FIG. 6B, respectively.

After the subscription process has been successfully completed, data items corresponding to the subscription data and stored in database(s) of the primary organization may be shared with the secondary organization. More particularly, data items may be shared via the connection between the organizations. In some implementations, updates to the data items are automatically shared with the secondary organization. For example, updates to data items may be replicated in corresponding fields of database(s) of the secondary organization. As another example, updates to data items may be forwarded via electronic mail to the secondary organization, enabling the secondary organization to accept or reject the updates. In other implementations, updates to the data items may be shared with the secondary organization in response to a manual operation.

Updates to data items may include, but are not limited to, creating (e.g., storing) a data item, modifying a data item, and/or deleting a data item. A data item may correspond to one or more fields of a database. For example, a data item may correspond to a particular field of an object. As another example, a data item may be an object corresponding to a particular object type.

Figure 6A:
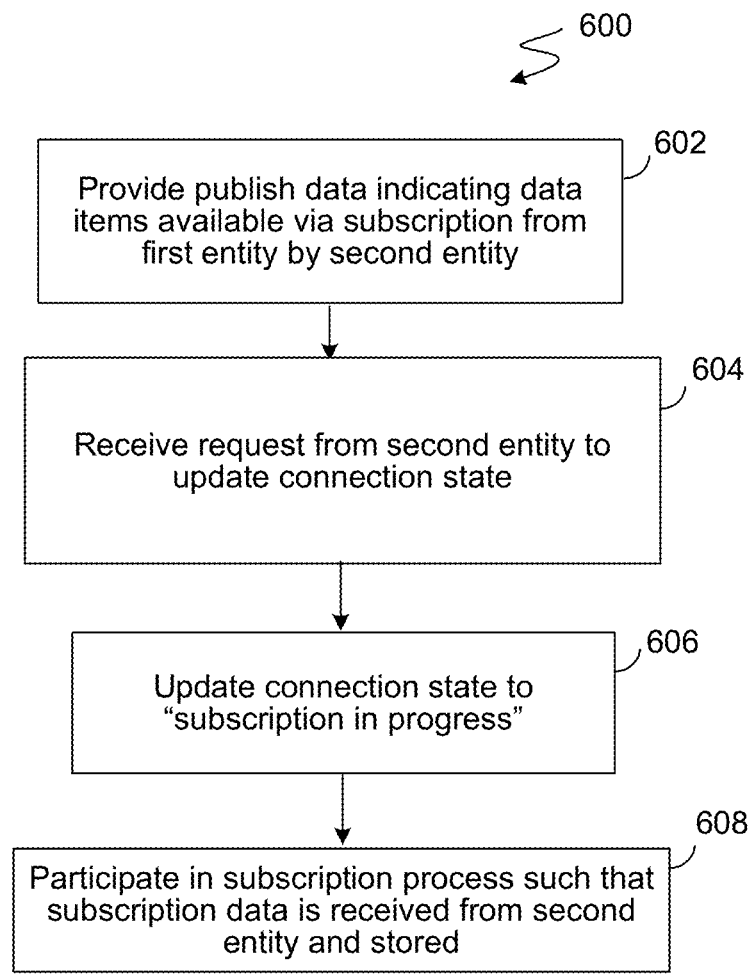
FIG. 6A shows a flowchart of an example of a method 400 facilitating an asynchronous subscription process for synchronization of data by a primary organization, in accordance with some implementations.

FIG. 6A shows a flowchart of an example of a method 600 facilitating an asynchronous subscription process for synchronization of data by a primary organization, in accordance with some implementations. A primary organization may provide publish data indicating data items available via subscription from the primary organization (e.g., entity) by a secondary organization at 602. For example, the primary organization may transmit the publish data to the primary organization via the connection between the primary organization and the secondary organization. The publish data may indicate types of data available by subscription from the primary organization by the secondary organization. In some implementations, the publish data indicates a set of object types and indicates, for each object type of the set of object types, a corresponding set of fields.

The primary organization may receive a request from the secondary organization at 604 that requests that the primary organization update its connection state pertaining to a connection between the primary organization and the secondary organization. In response to receiving the request, the primary organization may update its connection state to Subscription in Progress at 606. In addition, the primary organization may save its previous connection state so that it may re-establish the previous connection state after the subscription process is completed. In some implementations, after the connection state has been updated to Subscription in Progress, the primary organization cannot modify the publish data.

The primary organization may participate in a subscription process initiated by the secondary organization, as shown at 608. In some implementations, the primary organization participates in the subscription process after updating its connection state to Subscription in Progress. In other implementations, the primary organization receives the request to update its connection state at the beginning of the subscription process. The request may be explicit or implicit. For example, the primary organization may update its connection state in response to receiving a request to initiate a subscription process from the secondary organization.

During the subscription process, subscription data such as that described above may be received by the primary organization from the secondary organization. The primary organization may save the subscription data or a portion thereof as it is received from the secondary organization. In one implementation, the subscription data indicates at least a subset of the published set of object types and indicates, for each such object type, at least a subset of the corresponding set of fields.

Upon completion of the subscription process, the primary organization may update the connection state to the previous connection state. For example, the primary organization may update the connection state to Active. In one implementation, data items that correspond to the subscription data may be shared by the primary organization with the secondary organization during the Active state.

Figure 6B:
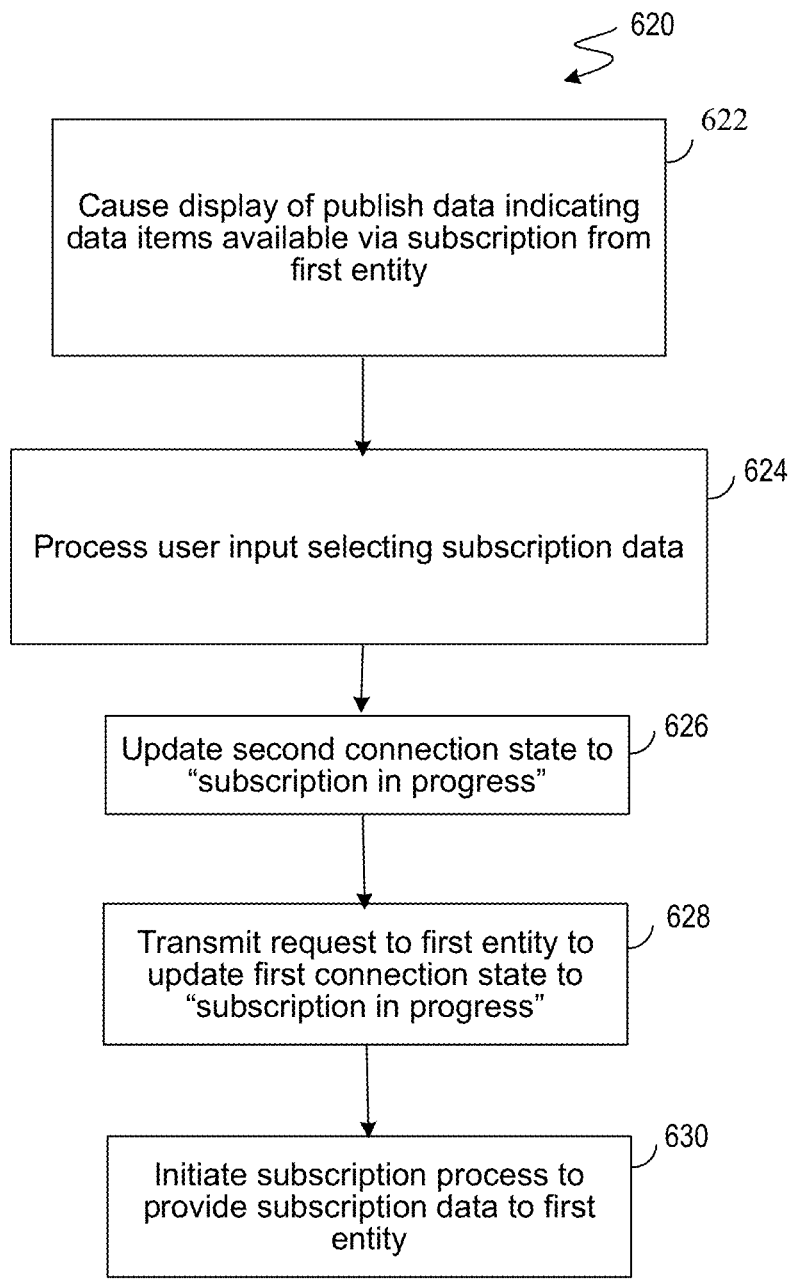
FIG. 6B shows a flowchart of an example of a method 600 facilitating an asynchronous subscription process by a secondary organization, in accordance with some implementations.

FIG. 6B shows a flowchart of an example of a method 620 facilitating an asynchronous subscription process by a secondary organization, in accordance with some implementations. Publish data provided by a primary organization may be caused to be displayed at 622 in a user interface on a display of a user device of the secondary organization. The publish data may indicate the data types of data items available via subscription from the primary organization. As discussed above, the publish data may indicate a set of object types. In addition, the publish data may indicate, for each object type of the set of object types, a set of fields.

The secondary organization may process user input submitted at the user device at 624. The user input may select subscription data, where the subscription data indicates at least a subset of the set of object types. In addition, the subscription data may indicate, for each selected object type, at least a subset of the corresponding set of fields. The secondary organization may save the subscription data. In some implementations, a subscription event indicating the subscription data is added to an event queue so that it may be processed at a later time.

The secondary organization may update a second connection state maintained by the second entity and pertaining to a connection between the first entity and the second entity at 626 to Subscription in Progress such that the subscription data cannot be modified. In addition, the secondary organization may transmit a request to the primary organization at 628 that requests the primary organization update a first connection state maintained by the first entity and pertaining to the connection between the first entity and the second entity to Subscription in Progress such that the publish data cannot be modified.

The secondary organization may initiate a subscription process with the primary organization to provide the subscription data to the primary organization. In some implementations, the secondary organization may initiate the subscription process at 630 after the second connection state has been updated. For example, the subscription process is initiated by a message handler that processes events in event queue(s) of the secondary organization. During the subscription process, the subscription data may be saved in database(s) of the primary organization. An example of a subscription process that may be performed will be described in further detail below with reference to FIG. 7.

In some implementations, the database(s) of the primary organization store metadata that pertains to fields of the database(s). More particularly, the metadata may indicate various triggers (e.g., rules) for sharing data items corresponding to those fields. In other words, a trigger may indicate connections between fields and rules for sharing data associated with those fields where another organization has subscribed to at least one of the fields. For example, where the subscription data indicates that the secondary organization has subscribed to the object type "Account" and field "Account Name," a trigger may indicate that data items that correspond to "Account Name" and "Account Number" fields of an "Account" object are to be shared with the secondary organization (even when the secondary organization has not subscribed to "Account Number" field).

In some implementations, during the subscription process, metadata associated with the subscription data is identified and shared with the secondary organization, where the metadata indicates one or more triggers associated with the subscription data. For example, the metadata associated with the subscription data may be copied and stored in a database associated with the secondary entity.

Upon completion of the subscription process, the secondary organization may update its connection state to the previous connection state. For example, the second connection state may be updated to an Active state. In addition, the secondary organization may notify the user that the subscription process has been successfully completed. For example, a notification may be presented on a display of the user device. As another example, the notification may be transmitted to the user via an electronic mail message.

Figure 7:
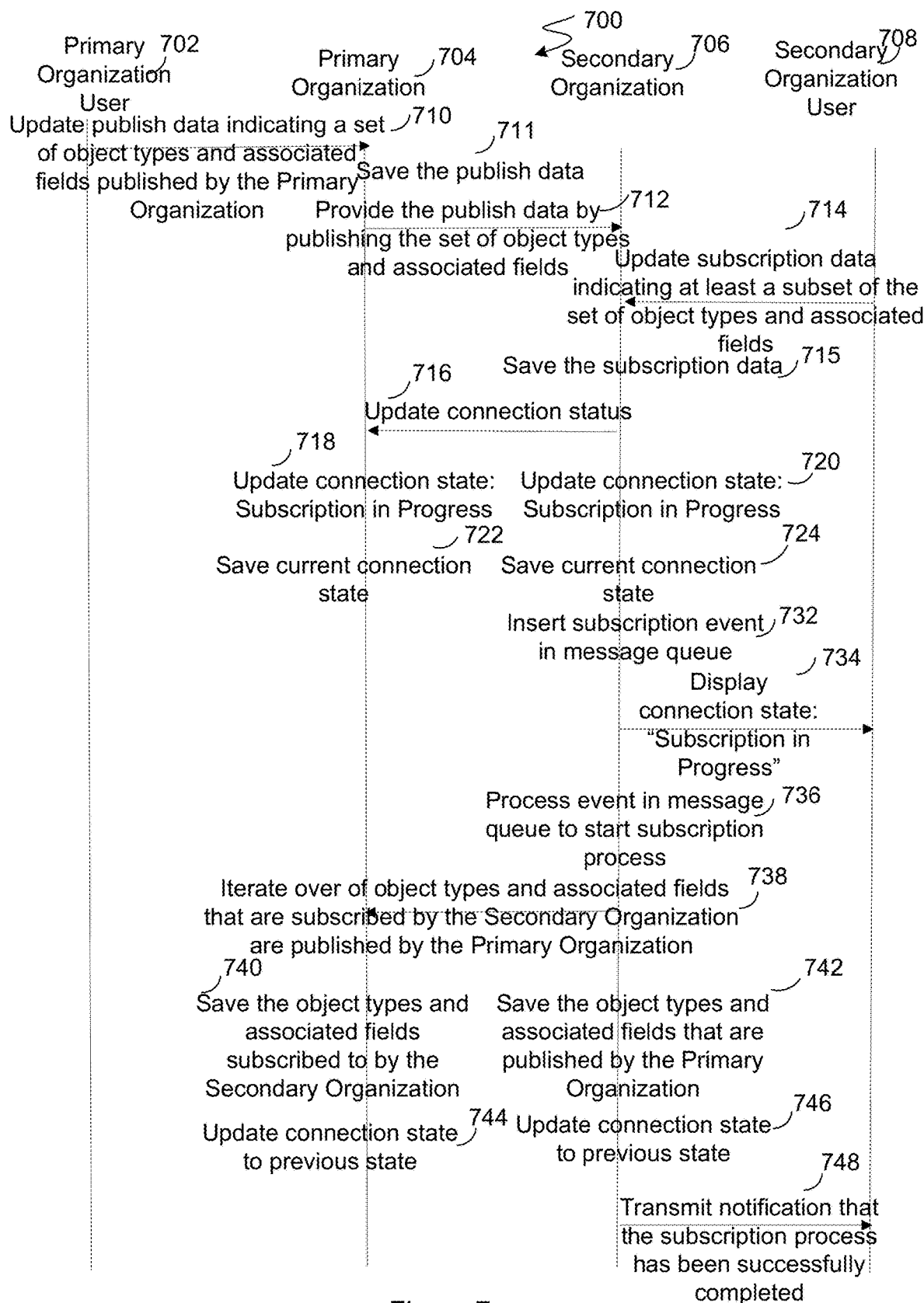
FIG. 7 shows a transaction flow diagram of an example of an asynchronous subscription process, in accordance with some implementations.

FIG. 7 shows a transaction flow diagram of an example of an asynchronous subscription process, in accordance with some implementations. Operations performed by a user of the primary organization, a system of the primary organization, a system of the secondary organization, and a user of the secondary organization are represented by vertical lines 702, 704, 706, 708, respectively.

To identify the data items maintained by the primary organization that may be shared with the secondary organization, the primary organization may publish object types and fields that can be subscribed to by the secondary organization. The term "publish data" may be used to refer to the object types and fields published by the primary organization.

As shown at 710, a user 702 of the primary organization may update publish data indicating a set of object types and associated fields that are to be published by the primary organization. For example, the user 702 may access one or more UIs such as those described above with reference to FIGS. 1-3B. The primary organization 704 may save the publish data, as shown at 711.

The primary organization 704 may provide the publish data to the secondary organization 706 at 712. For example, the primary organization may transmit the publish data to the secondary organization via the connection between the two organizations. The secondary organization may then subscribe to the published object types and fields or a subset thereof. The term "subscription data" may be used to refer to a subset of the publish data to which the secondary organization subscribes.

As shown in this example, the secondary organization may present the published object types and associated fields for selection via a graphical user interface. A user 708 of the secondary organization may then update subscription data indicating at least a subset of the published object types and associated fields at 714. For example, the user 708 may access one or more UIs such as those described above with reference to FIGS. 5A-5C. In some implementations, the subscription data may also indicate a mapping between the selected object types and fields of the primary organization and a corresponding set of object types and fields of database(s) of the secondary organization. The secondary organization 706 may save the subscription data to a memory, as shown at 715.

Before initiating a subscription process between the primary organization and the secondary organization, the primary and secondary organizations may update their connection states to prevent the publish data and subscription data from being modified before the subscription process is completed. As shown in this example, the secondary organization 706 may request that the primary organization update its connection state for the connection between the primary organization and secondary organization at 716. The primary organization 704 and secondary organization 706 may each independently update its connection state for the connection to Subscription in Progress, as shown at 718 and 720, respectively. In addition, the primary organization 704 and secondary organization 706 may each independently save its current connection state at 722 and 724, respectively.

In some implementations, to enable the subscription process to be performed asynchronously at a time that is independent from the updating of the subscription data, the secondary organization 706 adds a subscription event to a queue such as a message queue at 732. The subscription event may be represented by a queue entry that includes the subscription data or is otherwise linked to the subscription data. The secondary organization 706 may notify the user 708 of the secondary organization that the subscription process has been initiated at 734. For example, such a notification may be transmitted via a display or electronic mail.

A subscription process may then be performed via the connection between the primary organization and the secondary organization. For example, the secondary organization may call an application programming interface (API) of the primary organization. In some implementations, the secondary organization initiates the subscription process between the primary organization and the secondary organization. As shown at 736, the secondary organization 706 may process the subscription event in the queue to initiate the subscription process. For example, the subscription process may be initiated by a message handler that processes events in the queue.

During the subscription process, the secondary organization 706 may provide the subscription data to the primary organization 704 at 738. More particularly, the secondary organization may iterate over the object types and fields to which the secondary organization is subscribing.

For each field to which the secondary organization is subscribing, the secondary organization may provide the primary organization 704 information that maps the published field to a corresponding field of the secondary organization. In some implementations, the secondary organization may verify that the field to which the secondary organization has subscribed is published by the primary organization.

As the primary organization receives the subscription data from the secondary organization, the primary organization may save the subscription data. More particularly, the primary organization 704 may save information identifying or otherwise indicating the object types and associated fields subscribed to by the secondary organization at 740. For example, the primary organization may save information that maps the fields of the primary organization to which the secondary organization has subscribed to corresponding fields of the secondary organization.

Similarly, the secondary organization 706 may save information identifying or otherwise indicating the object types and associated fields published by the primary organization to which the secondary organization subscribed, as shown at 742. The information saved by the secondary organization may map the fields of the primary organization to which the secondary organization has subscribed to corresponding fields of the secondary organization.

After the subscription process has been completed, the connection state associated with the connection between the primary organization and the secondary organization may be returned to the previous state. More particularly, the primary organization 704 and secondary organization 706 may each ascertain its previous connection state and return the connection state to the previous state, as shown at 744 and 746, respectively. In some implementations, the primary organization may share data items corresponding to the subscription data when the connection state maintained by both organizations is Active.

Some but not all of the techniques described or referenced herein are implemented using or in conjunction with a customer relationship management (CRM) system or other database management system. CRM systems have become a popular way to manage and analyze customer interactions and data throughout the business lifecycle. Salesforce.com, inc. is a provider of CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud.

Some CRM systems can be implemented in various settings, including organizations. For instance, a CRM system can be implemented to provide database access to users within an enterprise such as a company or business partnership, or a group of users within such an organization. For instance, employee users in a division of a business organization may share data with users in another division of the business organization. In the example of a multi-tenant database system, each organization or group within the organization can be a respective tenant of the system, as described in greater detail below. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as customer sales data for a potentially much greater number of customers.

Where there are multiple tenants, a user is typically associated with a particular tenant. For example, a user could be a salesperson of a company, which is a tenant of the database system that provides a database service.

In some implementations, data objects in the form of CRM records such as cases, accounts, or opportunities are stored in a database system. Updates to a record may include any change to a record. Examples of record updates include field changes in the record, updates to the status of a record, as well as the creation or deletion of the record itself.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get.

In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

A record can also have a status, the update of which can be provided by an owner of the record or other users having suitable write access permissions to the record. The owner can be a single user, multiple users, or a group.

In various implementations, an event can be an update of a record and/or can be triggered by a specific action by a user. Which actions trigger an event can be configurable.

Some non-limiting examples of systems, apparatus, and methods are described below for implementing database systems and enterprise level networking systems in conjunction with the disclosed techniques. Such implementations can provide more efficient use of a database system. As described herein, an asynchronous subscription process may enable a primary organization to subscribe to receive data corresponding to specific data types from a secondary organization without resulting in a timeout. In some implementations, to facilitate the asynchronous subscription process, publish data and subscription data cannot be modified until the subscription process is completed.

Figure 8A:
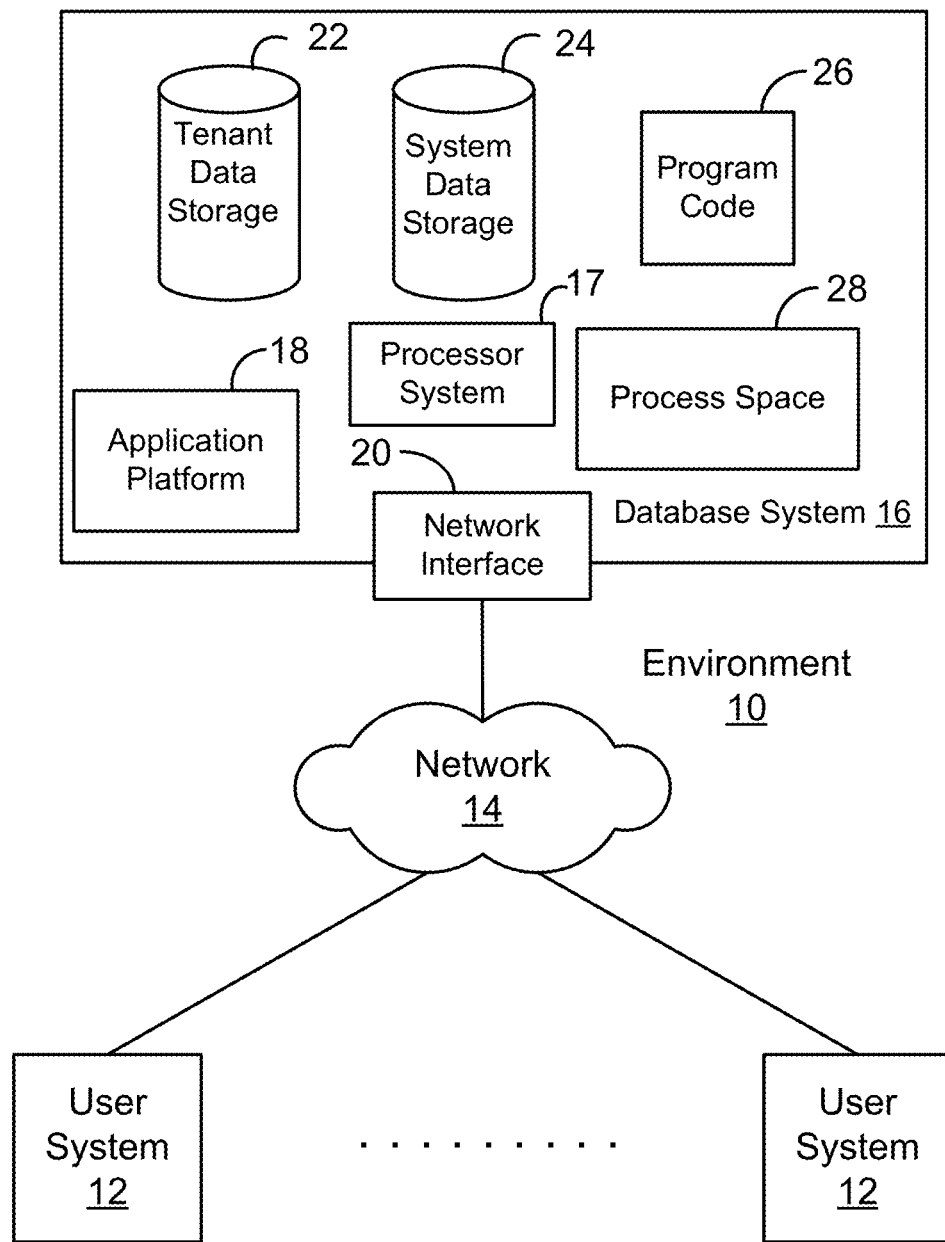
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
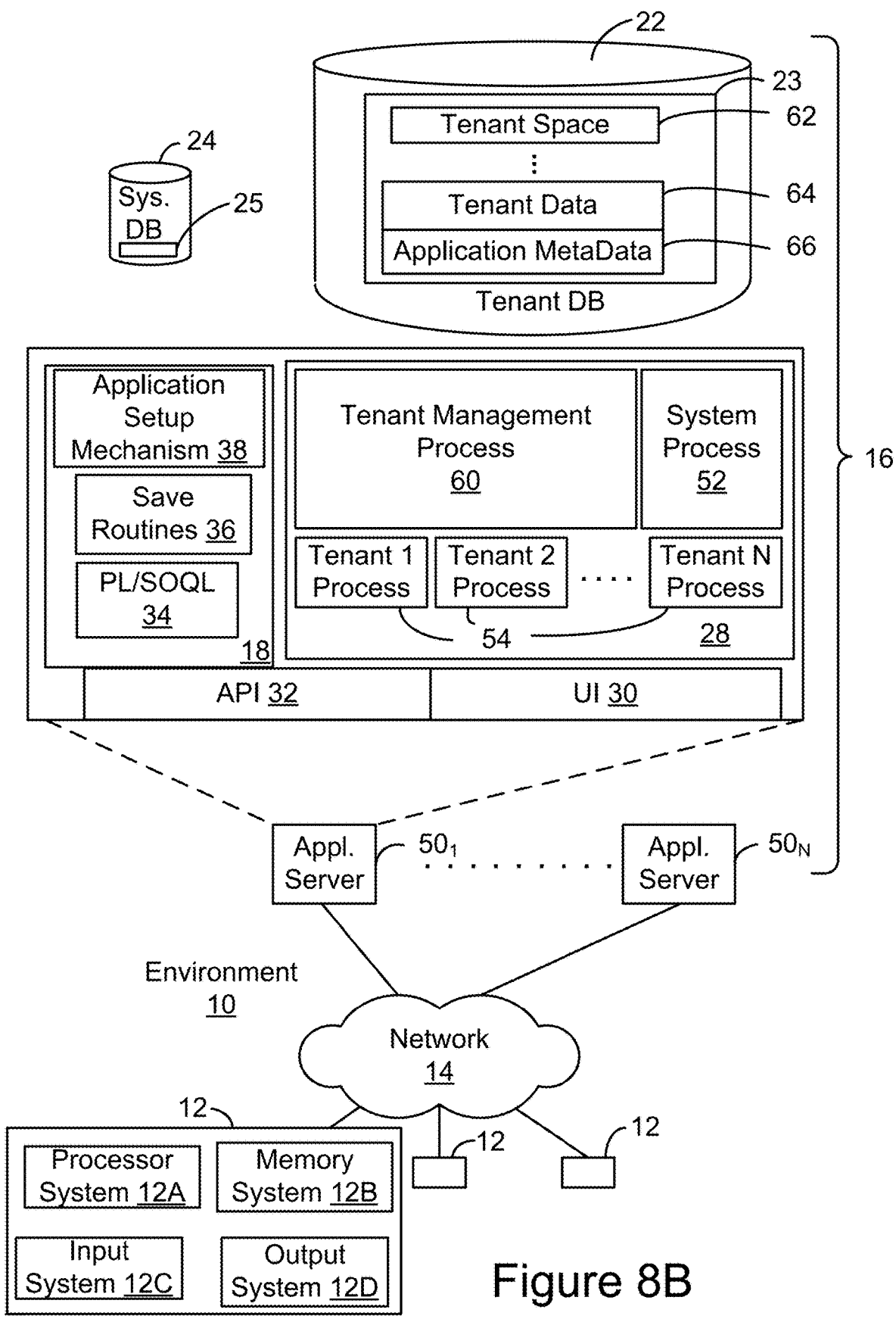
FIG. 8B shows a block diagram of an example of some implementations of elements of FIG. 8A and various possible interconnections between these elements.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data (e.g., data item) for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
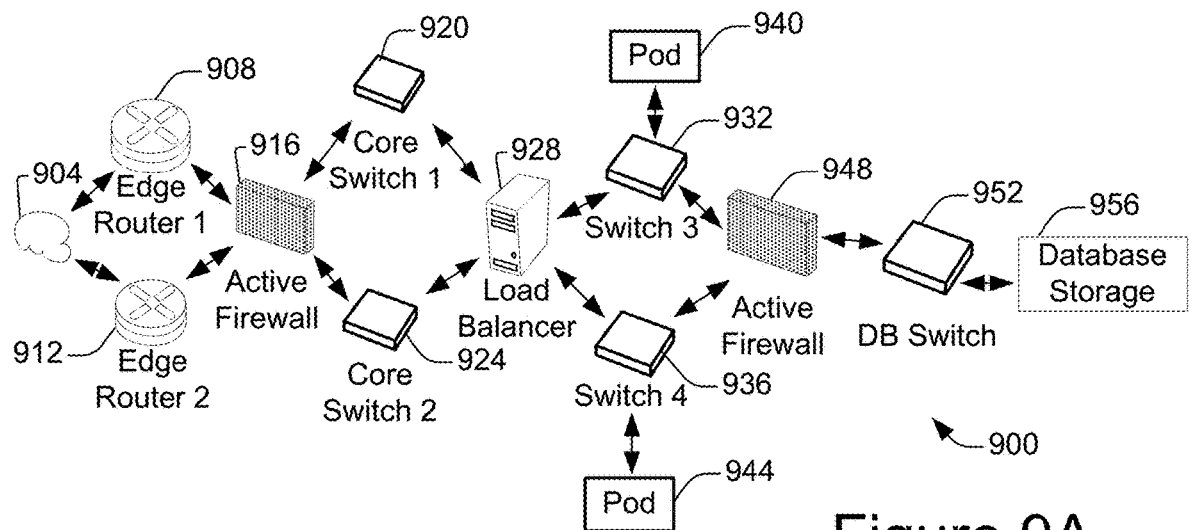
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
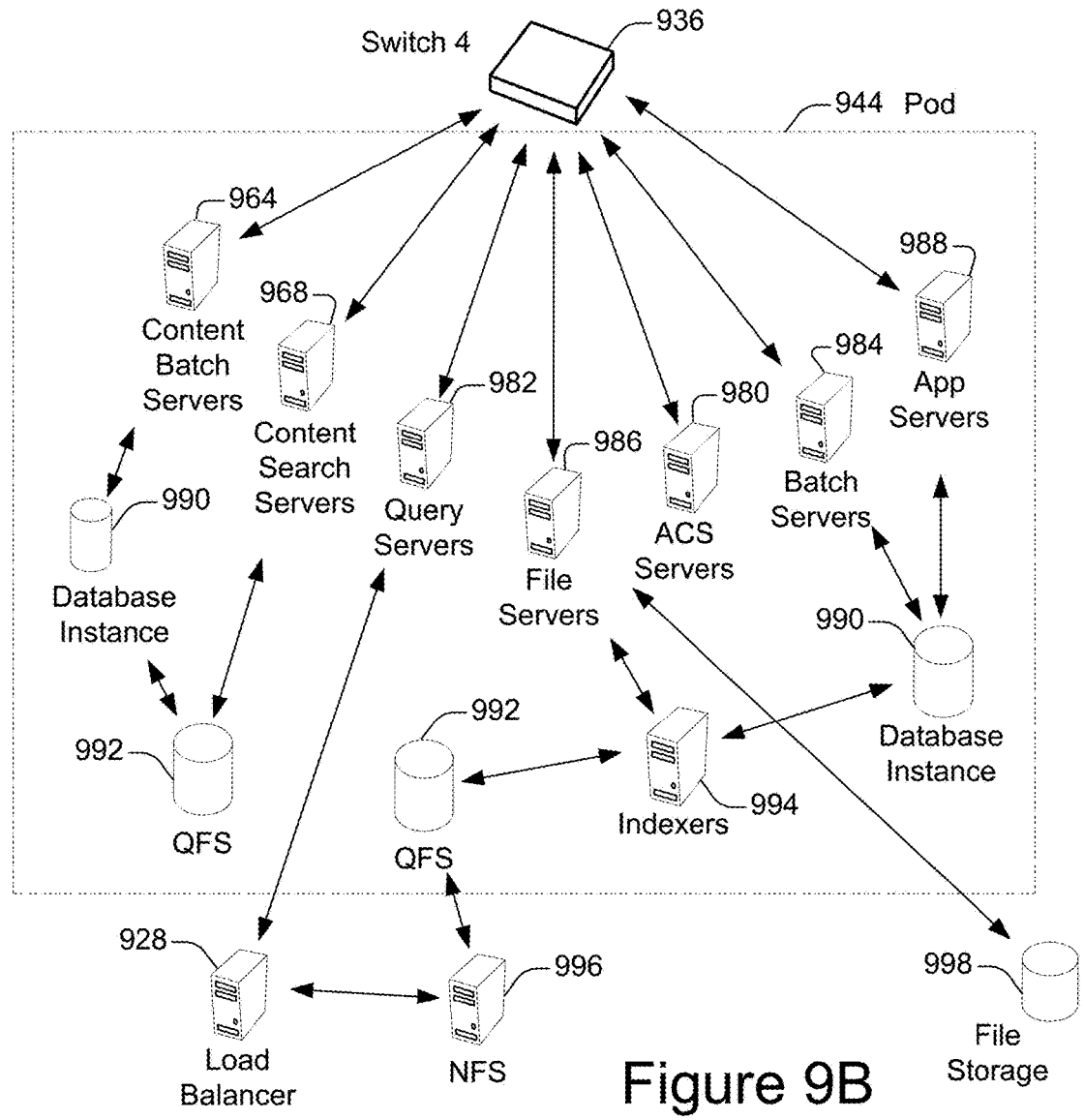
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above with reference to FIGS. 1-7 by instructing another computing device to perform an operation. In some implementations, one or more application servers $50_1$-$50_N$ carry out, either partially or entirely, one or more of the disclosed operations described with reference to FIGS. 1-7. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein, including operations described above with reference to FIGS. 1-7. In alternative implementations, two or more app servers 988 may cooperate to perform or cause performance of such operations. Any of the databases and other storage facilities described above with reference to FIGS. 8A, 8B, 9A and 9B can be configured to store lists, articles, documents, records, files, and other objects for implementing the operations described above with reference to FIGS. 1-7. For instance, lists of published fields associated with corresponding connections can be maintained in tenant data storage 22 and/or system data storage 24 of FIGS. 8A and 8B. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 8A, 8B, 9A and 9B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
providing, for presentation on a display of a user device, publish metadata indicating a first set of object types of data objects stored in at least one database of a first entity and available via subscription from the first entity;
processing, by a second entity, subscription metadata received from the user device, the subscription metadata indicating a subset of the first set of object types, the subset selected for subscription by user input associated with the presentation of the publish metadata on the display of the user device;
transmitting, by the second entity to the first entity, a request to update a first transaction state to indicate that a subscription is in progress, wherein the publish metadata cannot be modified while the first transaction state indicates that the subscription is in progress;
updating, by the second entity, a second transaction state to indicate that the subscription is in progress, wherein the subscription metadata cannot be modified while the second transaction state indicates that the subscription is in progress; and
after updating the second transaction state and transmitting the request, initiating a subscription process to provide the subscription metadata to the first entity.

2. The system as recited in claim 1, the database system further configurable to cause:
adding a subscription event to a message queue; and
initiating the subscription process by a message handler that processes the subscription event.

3. The system as recited in claim 1, the database system further configurable to cause:
responsive to completion of the subscription process, updating the second transaction state from subscription in progress to a previous transaction state.

4. The system as recited in claim 1, the database system further configurable to cause:
responsive to completion of the subscription process, updating the second transaction state from subscription in progress to an active state.

5. A method, comprising:
providing, for presentation on a display of a user device, publish metadata indicating a first set of object types of data objects stored in at least one database of a first entity and available via subscription from the first entity;
processing, by a second entity, subscription metadata received from the user device, the subscription metadata indicating a subset of the first set of object types, the subset selected for subscription by user input associated with the presentation of the publish metadata on the display of the user device;
transmitting, by the second entity to the first entity, a request to update a first transaction state to indicate that a subscription is in progress, wherein the publish metadata cannot be modified while the first transaction state indicates that the subscription is in progress;
updating, by the second entity, a second transaction state to indicate that the subscription is in progress, wherein the subscription metadata cannot be modified while the second transaction state indicates that the subscription is in progress; and
after updating the second transaction state and transmitting the request, initiating a subscription process to provide the subscription metadata to the first entity.

6. The method as recited in claim 5, further comprising:
adding a subscription event to a message queue; and
initiating the subscription process by a message handler that processes the subscription event.

7. The method as recited in claim 5, further comprising:
responsive to completion of the subscription process, updating the second transaction state from subscription in progress to a previous transaction state.

8. The method as recited in claim 5, further comprising:
responsive to completion of the subscription process, updating the second transaction state from subscription in progress to an active state.

9. The method as recited in claim 5, further comprising:
causing display, on the display of the user device of a notification that the subscription process is successfully completed.

10. The method as recited in claim 5, further comprising:
identifying metadata associated with the subscription metadata, wherein the metadata indicates triggers associated with the subscription metadata; and
storing the metadata in a database associated with the second entity.

11. A computer program product comprising computer-readable program code capable of being executed by one or more processors when retrieved from a non-transitory computer-readable medium, the program code comprising instructions configurable to cause:
providing publish metadata by a first entity, the publish metadata indicating a first set of object types of data objects stored in at least one database of the first entity and available via subscription from the first entity by a second entity;
processing, by the first entity, a request received from the second entity;
responsive to processing the request, updating, by the first entity, a first transaction state to indicate that a subscription is in progress, wherein the publish metadata cannot be modified while the first transaction state indicates that a subscription is in progress; and
after updating the first transaction state to indicate that a subscription is in progress, participating in a subscription process such that subscription metadata is received by the first entity from the second entity and stored in a database by the first entity, the subscription metadata indicating a subset of the first set of object types, the subset selected for subscription by user input associated with presentation of the publish metadata on a display of a user device.

12. The computer program product as recited in claim 11, the computer program instructions further configurable to cause:
responsive to completing the subscription process, updating, by the first entity, the first transaction state to a previous transaction state.

13. The computer program product as recited in claim 11, the computer program code instructions further configurable to cause:

responsive to completing the subscription process, setting, by the first entity, the first transaction state to an active state.

14. The computer program product as recited in claim 11, the computer program instructions further configurable to cause:

ascertaining a mapping between the subscription metadata and a set of fields of one or more databases of the second entity.

15. A system comprising:

a database system implemented using a server system, the database system configurable to cause:

providing publish metadata by a first entity, the publish metadata indicating a first set of object types of data objects stored in at least one database of the first entity and available via subscription from the first entity by a second entity;

processing, by the first entity, a request received from the second entity;

responsive to processing the request, updating, by the first entity, a first transaction state to indicate that a subscription is in progress, wherein the publish metadata cannot be modified while the first transaction state indicates that a subscription is in progress; and after updating the first transaction state to indicate that a subscription is in progress, participating in a subscription process such that subscription metadata is received by the first entity from the second entity and stored in a database by the first entity, the subscription metadata indicating a subset of the first set of object types, the subset selected for subscription by user input associated with presentation of the publish metadata on a display of a user device.

16. The system as recited in claim 15, the database system further configurable to cause:

responsive to completing the subscription process, updating, by the first entity, the first transaction state to a previous transaction state.

17. The system as recited in claim 15, the database system further configurable to cause:

responsive to completing the subscription process, setting, by the first entity, the first transaction state to an active state.

18. The system as recited in claim 15, the database system further configurable to cause:

prior to participating in the subscription process, saving a current status of the first transaction state.

19. The system as recited in claim 15, the database system further configurable to cause:

processing an indication of the user input submitted at the user device, the user input indicating the publish metadata; and saving the publish metadata in a database of the first entity.

20. The system as recited in claim 15, the database system further configurable to cause:

ascertaining a mapping between the subscription metadata and a set of fields of one or more databases of the second entity.

\* \* \* \* \*